(12) United States Patent
Sever

(10) Patent No.: US 12,009,722 B2
(45) Date of Patent: Jun. 11, 2024

(54) ELECTRIC MACHINE

(71) Applicant: Mahle International GmbH, Stuttgart (DE)

(72) Inventor: Peter Sever, Murska Sobota (SI)

(73) Assignee: Mahle International GmbH (DE)

( * ) Notice: Subject to any disclaimer, the term of this patent is extended or adjusted under 35 U.S.C. 154(b) by 568 days.

(21) Appl. No.: 17/276,118

(22) PCT Filed: Jul. 24, 2019

(86) PCT No.: PCT/EP2019/069903
§ 371 (c)(1),
(2) Date: Mar. 12, 2021

(87) PCT Pub. No.: WO2020/052846
PCT Pub. Date: Mar. 19, 2020

(65) Prior Publication Data
US 2022/0037950 A1    Feb. 3, 2022

(30) Foreign Application Priority Data

Sep. 13, 2018  (DE) ...................... 10 2018 215 608.5

(51) Int. Cl.
*H02K 5/12* (2006.01)
*B60L 50/51* (2019.01)
(Continued)

(52) U.S. Cl.
CPC .............. *H02K 5/128* (2013.01); *B60L 50/51* (2019.02); *H02K 5/1732* (2013.01); *H02K 5/18* (2013.01);
(Continued)

(58) Field of Classification Search
CPC ........ H02K 5/128; H02K 5/1732; H02K 5/18; H02K 9/22; H02K 9/223; H02K 9/227; H02K 5/203; B60L 50/51; Y02T 10/70
See application file for complete search history.

(56) References Cited

U.S. PATENT DOCUMENTS

| 5,214,325 A | 5/1993 | Matson et al. |
| 5,744,880 A * | 4/1998 | Kudoh ..................... H02K 5/20 |
| | | 310/58 |

(Continued)

FOREIGN PATENT DOCUMENTS

| AT | 517533 B1 | 6/2017 |
| CH | 545552 A | 1/1974 |

(Continued)

OTHER PUBLICATIONS

English abstract for FR-2711283.
(Continued)

*Primary Examiner* — Thomas Truong
(74) *Attorney, Agent, or Firm* — Fishman Stewart PLLC

(57) ABSTRACT

An electric machine for a vehicle is disclosed. The electric machine includes a stator and a rotor rotatable relative to the stator about a rotational axis that defines an axial direction. A housing at least partially surrounds a housing interior and includes a first housing part and a second housing part that bound the housing interior. The rotor is rotatably mounted on the first housing part and the second housing part via a bearing device. At least one heat transmission body is arranged along the axial direction between at least one of the first and second housing parts and the rotor. The heat transmission body bounds, together with the at least one of the first and second housing parts, a coolant space through which a coolant can flow.

29 Claims, 2 Drawing Sheets

(51) Int. Cl.
*H02K 5/128* (2006.01)
*H02K 5/173* (2006.01)
*H02K 5/18* (2006.01)
*H02K 9/22* (2006.01)
*H02K 5/20* (2006.01)

(52) U.S. Cl.
CPC .............. *H02K 9/22* (2013.01); *H02K 9/223* (2021.01); *H02K 9/227* (2021.01); *H02K 5/203* (2021.01)

(56) References Cited

U.S. PATENT DOCUMENTS

| | | | |
|---|---|---|---|
| 10,050,495 | B2 | 8/2018 | Garriga et al. |
| 2002/0177935 | A1 | 11/2002 | Winner et al. |
| 2005/0275297 | A1* | 12/2005 | Suzuki ................ H02K 5/225 310/71 |
| 2011/0304226 | A1 | 12/2011 | Bradfield |
| 2013/0034052 | A1 | 2/2013 | Saito |
| 2013/0069455 | A1* | 3/2013 | Hamer ................ H02K 9/227 264/266 |
| 2013/0342052 | A1 | 12/2013 | Turnbull et al. |
| 2014/0062227 | A1* | 3/2014 | Lang ................ H02K 9/08 310/52 |
| 2018/0309343 | A1* | 10/2018 | Tolksdorf ............... H02K 11/33 |

FOREIGN PATENT DOCUMENTS

| | | |
|---|---|---|
| CN | 105264752 A | 1/2016 |
| CN | 107070062 A | 8/2017 |
| CN | 207069817 U | 3/2018 |
| DE | 102013211361 A1 | 12/2013 |
| EP | 1193837 A2 | 4/2002 |
| FR | 2711283 A1 | 4/1995 |
| FR | 2780576 A1 | 12/1999 |
| GB | 2339084 A | 1/2000 |
| WO | 2017018578 A1 | 2/2017 |

OTHER PUBLICATIONS

English abstract for AT-517533.
Chinese Office Action dated Dec. 21, 2023 and Chinese Search Report dated Dec. 14, 2023 for Chinese Patent Application No. 201980060221.9.

* cited by examiner

ELECTRIC MACHINE

CROSS-REFERENCE TO RELATED APPLICATIONS

This application claims priority to International Patent Application No. PCT/EP2019/069903 filed Jul. 24, 2019, which also claims priority to German Patent Application DE 10 2018 215 608.5 filed Sep. 13, 2018, the contents of each of which is hereby incorporated by reference in its entirety.

TECHNICAL FIELD

The invention relates to an electric machine, in particular for a vehicle, as well as to a vehicle having such a machine.

Such an electric machine can generally be an electric motor or a generator. The electric machine can be embodied as an external rotor or as an internal rotor.

BACKGROUND

A machine of the generic type is known, for example, from U.S. Pat. No. 5,214,325. Said machine comprises a housing which surrounds a housing interior and which has a lateral surface which runs all around in a circumferential direction of the housing and radially bounds the housing interior, axially on one side, a rear side wall which axially bounds the housing interior, and axially on the other side, a front side wall which axially bounds the housing interior. A stator of the machine is permanently connected to the lateral surface. A rotor of the machine is arranged in the stator, wherein a rotor shaft of the rotor is rotatably mounted on the front side wall by means of a front shaft bearing.

The stator of a conventional electric machine typically comprises stator windings which are energized electrically during the operation of the machine. In this context, heat is produced in the rotor and has to be carried away in order to avoid overheating and associated damaging of or even destruction of the rotor. It is also necessary to carry away the heat in order to avoid demagnetizing the windings or permanent magnets of the rotor owing to an excessively high temperature.

It is known from the prior art to provide, in the housing of an electric machine, a cooling duct through which a coolant can flow, which coolant can in turn take up the waste heat generated in the machine and transport it out of the housing. In order to be able to carry away the heat present in the rotor particularly effectively, it is known from conventional electric machines to provide integrally on the housing and possibly near to the rotor a structure which has a large thermal interaction area, for example a ribbed structure, and a high thermal conductivity, so that it can take up a particularly large amount of heat from the rotor. Since such a structure is typically part of the housing which is positioned near to the rotor, in conventional electric machines the bearing of the rotor is typically in the region of said structures. However, this means that this structure has to be made correspondingly solid in order to be able to take up the forces generated during the rotational movement by the rotor. Therefore, a large wall thickness of the structure is necessary for said structure. However, this makes it more difficult to heat the rotor. In order to counteract this, materials with high thermal conductivity are used. However, this in turn entails considerable costs.

SUMMARY

An object of the present invention is to provide an improved embodiment for an electric machine in which the abovementioned disadvantages are largely or even completely eliminated. In particular, it is intended to provide an improved embodiment for an electric machine which is distinguished by improved cooling of the rotor with simultaneously low production costs.

This object is achieved by the subject matter of the independent patent claim(s). Preferred embodiments are the subject matter of the dependent patent claims.

The basic concept of the invention is accordingly to mount the rotor of the electric machine directly on the two end plates of the housing, that is to say on the two housing parts which axially bound the housing interior of the machine. In other words, in the machine according to the invention which is presented here the rotor is connected directly via a bearing device to the two end plates and mounted thereon. This ensures that forces generated by the rotor are introduced directly into the two end plates via the bearing device. This in turn permits a heat transmission body which, in order to take up waste heat from the stator, is arranged between a coolant path which is provided in the housing—and can be embodied as a cooling duct, coolant collector or coolant collector—and the rotor in the housing interior, to be embodied with particularly thin walls. This brings about a high heat transmission rate through the heat transmission body and therefore a particularly high cooling capacity which can be provided using the heat transmission body for the cooling of the rotor. According to the invention, the housing parts are embodied separately with respect to the heat transmission body. In other words, each of the two housing parts and the heat transmission body are embodied in two parts. This makes it possible to select a material with a lower thermal conductivity for the housing parts than for the heat transmission body. Since the materials with high thermal conductivity are more expensive to acquire than materials with low thermal conductivity, it is possible to achieve considerable cost savings in this way in respect of the fabrication of the electric machine.

In addition, the saving in material which is achieved with the thin-walled heat transmission bodies entails considerable cost advantages, since materials with a very high thermal conductivity are generally very expensive to acquire.

An electric machine according to the invention, in particular for a vehicle, comprises a stator and a rotor which can rotate relative to the stator about a rotational axis. An axial direction of the machine is defined by the rotational axis. The machine comprises a housing which surrounds a housing interior. In this context, the housing comprises a first and a second housing part, which bound the housing interior, preferably along the axial direction, and on which the rotor is rotatably mounted by means of a bearing device. The two housing parts can be, in particular, the axial "end plates" mentioned at the beginning. The bearing device can have two bearing elements, in particular of the shaft bearing type, wherein a first shaft bearing is arranged on the first housing part, and a second bearing element is arranged on the second housing part, preferably on a second end plate which lies axially opposite the first end plate. According to the invention, a heat transmission body is arranged axially between at least one housing part—that is to say the first or second housing part—and the rotor. This heat transmission body bounds, together with said housing part, a coolant space which is preferably embodied as a cooling duct, coolant collector space and/or coolant distributor space, through each of which a coolant is to flow.

According to one preferred embodiment, the heat transmission body is embodied separately from the two housing parts. This permits a different material to be selected for the housing parts than for the heat transmission body. Therefore, a material with a particularly high strength can be used for the housing parts, and a material with high thermal conductivity can be used for the heat transmission body.

According to one preferred embodiment, the heat transmission body and the two housing parts are embodied non-uniformly in respect of material. This makes it possible to use a material with a lower thermal conductivity for the housing parts than for the heat transmission structure. This brings about cost advantages in respect of the production of the machine. Alternatively or additionally, the material of the first and/or second housing part can have a higher upper yield strength and/or creep limit than the material of the heat transmission body.

According to one preferred embodiment, the material of the heat transmission body has a higher thermal conductivity than the material of the first and/or second housing part. Therefore, a material which is available in a relatively cost-effective fashion and has low thermal conductivity can be used in the housing parts which do not have to transmit heat from the rotor to the coolant space.

According to one preferred embodiment, a heat transmission structure for transmitting waste heat from the rotor to the heat transmission body is present on the respective heat transmission body.

The heat transmission structure and the two housing parts are expediently embodied non-uniformly in respect of material. This permits a material with a lower thermal conductivity to be used for the housing parts than for the heat transmission structure. This brings about cost advantages in respect of the production of the machine.

The material of the heat transmission structure particularly preferably has a higher thermal conductivity than the material of the first and/or second housing part. The heat transmission structure which is particularly critical for effective conduction away of heat from the rotor can be equipped selectively with particularly good heat transportation properties.

According to one advantageous development, the heat transmission body and the heat transmission structure are embodied uniformly in respect of material. In this way, effective transportation of heat is ensured both by the heat transmission structure and by the heat transmission body.

The rotor can be expediently directly mounted on the housing parts. This makes it possible to configure the heat transmission structure with particularly thin walls, since no bearing forces have to be introduced into the heat transmission structure from the rotor.

The rotor is particularly preferably not mounted on the housing part via the heat transmission structure and preferably also not via the heat transmission body. This variant also makes it possible to configure the heat transmission structure with particularly thin walls, since bearing forces do not have to be introduced into the heat transmission structure from the rotor.

The rotor is particularly preferably not mounted on the housing parts via the heat transmission structure, and preferably also not via the heat transmission body. This variant also makes it possible to configure the heat transmission structure with particularly thin walls, since bearing forces do not have to be introduced into the heat transmission structure from the rotor.

A wall thickness of the first and/or second housing part measured in the axial direction is expediently at least twice, preferably at least five times, a wall thickness of the heat transmission body. The heat transmission body can therefore be configured with particularly thin walls.

According to one preferred embodiment, in order to bound the coolant space there are at least two heat transmission bodies present which are both formed separately from the two housing parts. In this embodiment, a first heat transmission body is arranged axially between the first housing part and the rotor, and a second heat transmission body is arranged axially between the rotor and the second housing part.

According to one preferred embodiment, the bearing device comprises a first bearing element and a second bearing element which are arranged axially at a distance from one another, so that the rotor is arranged axially between the two bearing elements. In this embodiment, the axial position of the bearing elements is defined in such a way that less than 35%, preferably less than 10%, of the radial forces taken up by the bearing elements are passed on to the respective heat transmission body. This avoids overloading of the heat transmission body.

According to one preferred embodiment, the bearing device comprises a first bearing element by means of which the rotor is mounted on the first housing part, and a second bearing element by means of which the rotor is mounted on the second housing part. The two bearing elements are arranged at an axial distance from one another. In this embodiment, a distance measured along the axial direction between the first heat transmission body and the first housing part is larger than—and is preferably at least twice as large as—a distance between the first bearing element and the first housing part. In this embodiment, alternatively or additionally a distance measured along the axial direction between the second heat transmission body and the second housing part is larger than—and is preferably at least twice as large as—a distance between the second bearing element and the second housing part.

According to one preferred embodiment, the stator is attached to at least one of the two housing parts. In comparison with conventional electric machines in which the stator is attached to the heat transmission body, in this embodiment it is possible to embody the heat transmission body with particularly thin walls and to position it particularly close to the rotor. Furthermore, this embodiment entails further savings in terms of material and therefore cost advantages.

According to a further preferred embodiment, the stator is arranged at a distance from the heat transmission body or rests only loosely against it. In this way this can avoid a situation in which the heat transmission body is subjected to excessively high forces which could lead to damage thereto, in particular if said body is embodied with thin walls, as proposed here. In an alternative variant to this, the heat transmission body is clamped in between the stator and housing part with a prestressing force which is sufficient to ensure fluid-tight surface pressure for sealing elements, in particular of the elastomer seal type, lying between them.

The heat transmission body and the at least one housing part are preferably embodied in two parts. This makes it easier to select a different material, in particular with lower thermal conductivity, for the housing part than for the heat transmission body. This measure also entails considerable cost advantages in respect of the production of the electric machine.

In one further preferred embodiment, the heat transmission body is attached to the at least one housing part. A releasable or non-releasable attachment is conceivable here. The latter can be, in particular, a materially joined connection.

According to one advantageous development, the heat transmission structure comprises a plurality of projections which protrude axially from the rotor toward the heat transmission body and which engage in complementary recesses provided on the heat transmission body. According to one advantageous development which is an alternative thereto, the heat transmission structure comprises a plurality of projections which protrude axially from the heat transmission body toward the rotor and which engage in recesses which are complementary thereto and are provided on the rotor. In both alternatives, a large interaction area is ensured for the transmission of heat from the rotor to the heat transmission body.

The projections are particularly preferably embodied in the manner of a comb. Since the recesses which are embodied in a complementary fashion also have a comb-like geometry in this variant, this ensures a particularly large interaction area for the transmission of heat from the rotor to the heat transmission body.

The heat transmission body and the rotor for implementing the heat transmission structure are particularly preferably arranged relative to one another in such a way that in the region of the heat transmission structure an axial distance between the heat transmission body and the rotor—the latter is measured along the axial direction—is at maximum 1 mm, preferably at maximum 0.5 mm. In this variant, the annular gap or air gap which is formed between the heat transmission body and the rotor has a small gap width, so that effective transmission of heat from the rotor to the heat transmission body is ensured.

In order to implement the heat transmission structure, the heat transmission body and the rotor are particularly preferably arranged relative to one another in such a way that in the region of the heat transmission structure an axial distance between the heat transmission body and the rotor—the latter is measured along the axial direction—is at maximum 1 mm, preferably at maximum 0.5 mm. In this variant, the annular gap or air gap formed between the heat transmission body and rotor preferably has a small gap width so that effective transmission of heat from the rotor to the heat transmission body is ensured.

According to another preferred embodiment, the heat transmission body can be embodied as a cooling plate which extends at least in certain sections transversely with respect to the axial direction and whose wall thickness, measured along the axial direction, is at maximum 3 mm. The projections or recesses which produce the heat transmission structure are constructed or formed on or in this cooling plate along the axial direction.

A recess depth or projection height of the recesses or projections which form the heat transmission structure on the heat transmission body are particularly preferably three times, preferably at least five times, the wall thickness of the cooling plate. In this variant, the heat transmission structure has a large interaction area, so that a particularly large quantity of heat can be transmitted from the rotor to the heat transmission body per unit of time. At the same time, the cooling plate continues to be embodied with particularly thin walls.

The heat transmission body with the heat transmission structure can be a deep-drawn component, in particular sheet-metal shaped part, with a ribbed structure, wherein the ribbed structure is produced by means of a deep-drawing or shaping process.

According to one advantageous development, at least one housing part has an attachment section to which the heat transmission body is attached, wherein the bearing device for rotatably mounting the rotor is additionally provided on the attachment section. Both housing parts, that is to say both the first and second housing parts, particularly preferably have an attachment section which is configured in such a way. In this variant, the bearing device is not attached to the housing via the heat transmission body as is the case in many conventional electric machines. Therefore, the heat transmission body can be embodied with particularly thin walls.

The attachment section can particularly preferably be embodied as a sleeve which projects axially inward into the housing interior from the housing part, on the inner side of which sleeve a bearing element of the bearing device is arranged. Such a sleeve-like embodiment ensures particularly stable attachment of the bearing device to the housing part.

In a further preferred embodiment, the heat transmission body is produced from a different material than at least one of the two housing parts. The two housing parts are particularly produced from a different material than the heat transmission body. This variant makes it possible to use a relatively expensive material with a high thermal conductivity for the heat transmission body—as part of the heat transmission structure—while a more economic material with a low thermal conductivity can be used for the housing part or parts.

The material of at least one housing part, preferably of both housing parts, particularly expediently has a thermal conductivity which is lower than the thermal conductivity of the heat transmission body. Therefore, a relatively economically available material with a low thermal conductivity can be used in the housing parts which do not have to transmit heat from the rotor to the coolant space.

The material of the heat transmission body particularly preferably has a thermal conductivity of at least 100 W/(m*k), preferably of less than 150 W/(m*k). This ensures effective transportation of heat away from the rotor via the cooling duct to the coolant present in the coolant space.

An annular gap, which is part of the coolant space, can expediently be formed between the winding end sections of the stator coils which project into the coolant space, and the heat transmission body.

The invention also relates to a vehicle, in particular to a motor vehicle, having an electric machine as presented above. The advantages of the electric machine as explained above can therefore also be transferred to the vehicle according to the invention.

Further important features and advantages of the invention are apparent from the dependent claims, from the drawings and from the associated description of the figures with reference to the drawings.

Of course, the features which are mentioned above and which are to be explained below can be used not only in the respectively specified combination but also in other combinations or alone without departing from the scope of the present invention.

Preferred exemplary embodiments of the invention are illustrated in the drawings and will be explained in more detail in the following description.

BRIEF DESCRIPTION OF THE DRAWINGS

In the drawings, in each case in a schematic form.

DETAILED DESCRIPTION

Figure 1:
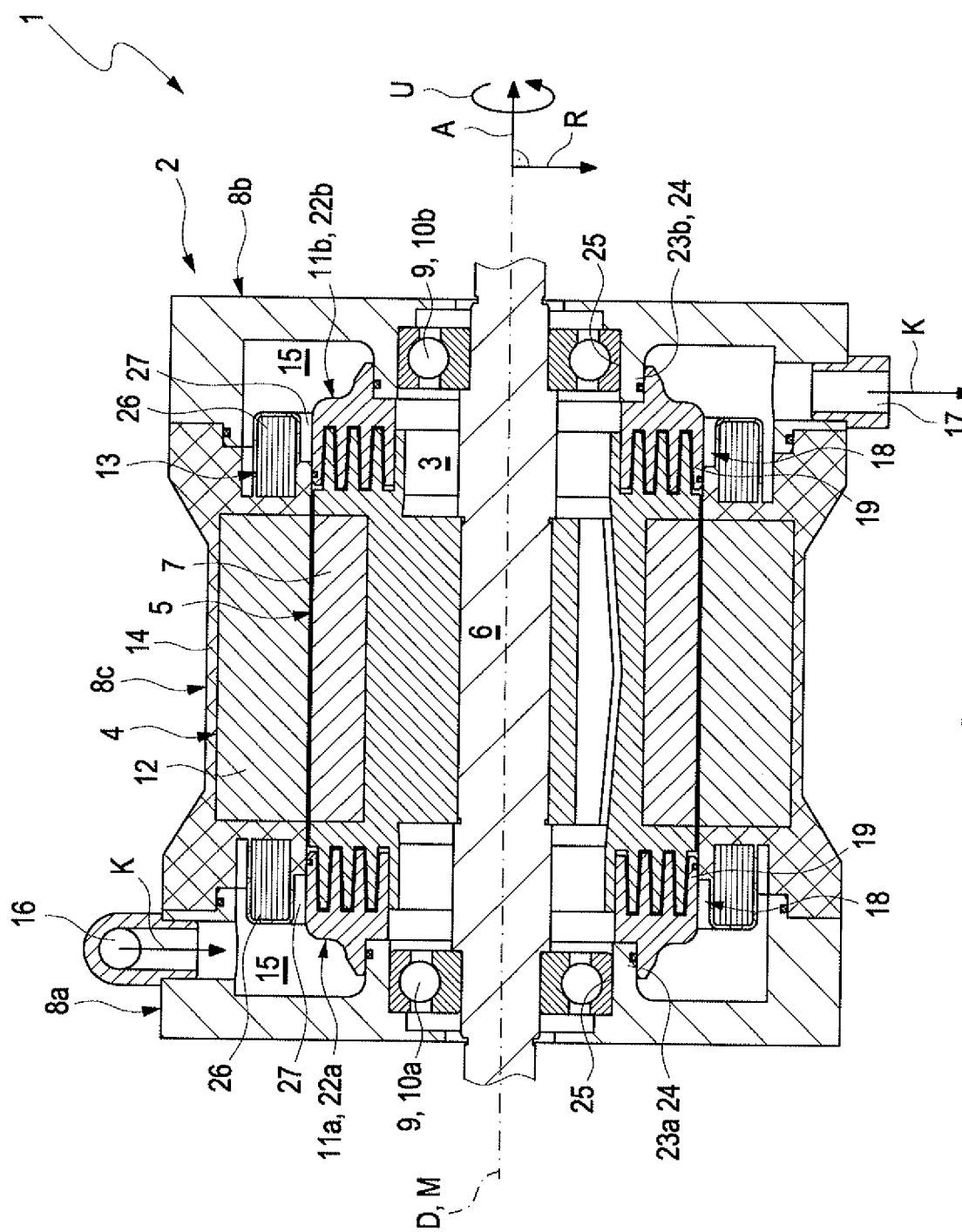
FIG. 1 shows an example of an electric machine according to the invention in a longitudinal section along the rotational axis of the rotor.

FIG. 1 illustrates an example of an electric machine 1 according to the invention. The machine 1 comprises a housing 2 which surrounds a housing interior 3. A stator 4 and a rotor 5 are arranged in the housing interior 3. The stator 4 can have a stator body 12 and a plurality of stator coils 13 (not illustrated in more detail in FIG. 1) which are embedded into the stator body 12 and can be energized electrically to drive the rotor 5. The stator 4 is permanently provided on a circumferential wall 14 of the housing 2.

The rotor 5 comprises a rotor shaft 6 and a plurality of permanent magnets 7 (not illustrated in more detail in FIG. 1) which are arranged in a co-rotational fashion on the rotor shaft 6. The rotor 5 can rotate relative to the stator 3 about a rotational axis D which is defined by the center longitudinal axis M of the rotor shaft 6. An axial direction A of the electric machine 1 is defined by the rotational axis D. A radial direction R extends away perpendicularly from the rotational axis D. A circumferential direction U runs around the rotational axis D. The permanent magnets 7 of the rotor 5 can be arranged with alternating magnetic polarization along the circumferential direction U of the rotor shaft 6. In other words, magnetic north poles N and magnetic south poles S alternate along the circumferential direction U.

As is apparent from FIG. 1, the housing 2 comprises a first and a second housing part 8a, 8b. These two housings parts 8a, 8b are also known to a person skilled in the art as what are referred to as "end plates" which bound the housing interior 3 along the axial direction A. A further third housing part 8c, which bounds the machine radially, is formed by an injection-molded encapsulation of the stator 5, which is made of plastic. The first and second housing parts 8a, 8b can also be embodied separately with respect to the third housing part 8c. The rotor 5 with the rotor shaft 6 is rotatably mounted on the housing 2 by means of a bearing device 9. For this purpose, the bearing device 9 comprises a first bearing element 10a, by means of which the rotor shaft 6 is rotatably mounted on the first housing part 7a. Correspondingly, the bearing device 9 comprises a second bearing element 10b, which is axially arranged at a distance from the first bearing element 10a, so that the rotor is arranged axially between the two bearing elements 10a, 10b, and by means of which second bearing element 10b the rotor shaft 6 is rotatably mounted on the second housing part 8b.

The two bearing elements 10a, 10b—also known to a person skilled in the art by the term "shaft bearing"—are for this purpose permanently connected to the first or second housing part 8a, 8b. The stator 4 with the stator body 12 and the stator coils 13 is also attached to the housing parts 8a, 8b, 8c.

Furthermore, a first and a second heat transmission body 11a, 11b for conducting away waste heat generated by the rotor 5 including its permanent magnets 7 during operation are provided in the housing interior 3. The two heat transmission bodies 11a, 11b are formed separately with respect to the two housing parts 8a, 8b and bound, together with the two housing parts 8a, 8b, a coolant space 15 which is formed as a cooling duct and through which a coolant K can flow. The first and second heat transmission bodies 11a, 11b and the housing parts 8a, 8b which are respectively assigned to the heat transmission bodies 11a, 11b are therefore each embodied in two parts. The first heat transmission body 11a can be attached to the first housing part 8a, for example by means of a materially joined connected. Correspondingly, the second heat transmission body 11b can preferably also be attached to the second housing part 8b by means of a materially joined connection. As an alternative to a materially joined connection it is also possible to consider a suitable releasable connection. The two heat transmission bodies 11a, 11b of the heat transmission structure 18 are preferably locked here exclusively by axial pressure. The rotor 5 is expediently mounted directly on the housing parts 8a, 8b. In particular, the rotor 5 is, as is apparent in FIG. 1, not mounted on the housing parts 8a, 8b via the heat transmission structure 18 and also not via the heat transmission bodies 11a, 11b.

The first heat transmission body 11a is arranged along the axial direction A between the first housing part 8a and the rotor 5. The second heat transmission body 11b is arranged along the axial direction A between the rotor 5 and the second housing part 8b. The coolant K can take up, via the two heat transmission bodies 11a, 11b, heat generated by the rotor 5 during the operation of the machine 1, so that overheating and associated damage to or even destruction of the machine 1 can be avoided. A coolant inlet 16 for feeding the coolant K into the coolant space 15 is provided on the external circumference of the housing 2 in the first housing part 8a, and a coolant outlet 17 for discharging the coolant K from the coolant space 15 is provided in the second housing part 8b. Heat is passed on to the coolant K flowing through the coolant space 15 and carried away from said space out of the machine 1 via the two heat transmission bodies 11a, 11b which each partially bound the coolant space 15.

The two heat transmission bodies 11a, 11b can both be embodied as cooling plates 22a, 22b which extend at least in certain sections transversely with respect to the axial direction A, that is to say along the radial direction R, and their wall thickness W measured along the axial direction A, in the region of the heat transmission structure 18, is at maximum 3 mm. The cooling plates 22a, 22b can be implemented by means of deep-drawn shaped sheet metal parts. As is apparent from FIG. 1, the two heat transfer bodies 11a and 11b are arranged at a distance from the stator 4 with the stator body 12 and only rest loosely against the latter with their contact sections 19. For example, a wall thickness, which is measured in the axial direction A, of the first and second housing parts 8a, 8b is at least twice, preferably at least five times, a wall thickness of the first and second heat transmission bodies 11a, 11b.

The heat transmission structure 18 and the two housing parts 8a, 8b are embodied non-uniformly in respect of the material. Likewise, the two heat transmission bodies 11a, 11b are embodied non-uniformly in respect of material in comparison with the two housing parts 8a, 8b. In comparison, the two heat transmission bodies 11a, 11b and the heat transmission structure 18 are embodied uniformly in respect of material. The material of the heat transmission structure 18 expediently has a higher thermal conductivity than the material of the first and second housing part 8a, 8b. Moreover, the material of the heat transmission body has a higher thermal conductivity than the material of the two housing parts 8a, 8b. The material of the two housing parts 8a, 8b has a thermal conductivity which is lower than the thermal conductivity of the heat transmission body 8a, 8b. In this way, costs can be saved during the production of the machine 1, since suitable materials with a high thermal conductivity are usually more expensive than materials with a low thermal conductivity. In order to ensure a high heat transmission performance from the rotor 5 to the respective housing part 8a, 8b via the heat transmission body 11a, 11b, the material of the heat transmission body 11a, 11b has a thermal conductivity of at least 100 W/(m*k), preferably of at least 150 W/(m*k).

The axial position of the bearing elements 10a, 10b along the axial direction A is expediently defined such that less than 35%, preferably less than 10%, of radial forces taken up by the bearing elements 10a, 10b is passed on to the heat transmission bodies 8a, 8b. This avoids overloading of the respective heat transmission body 8a, 8b.

The material of the first and second housing parts 8a, 8b can also have a higher upper yield strength and a higher creep limit than the material of the heat transmission bodies 11a, 11b.

Figure 2:
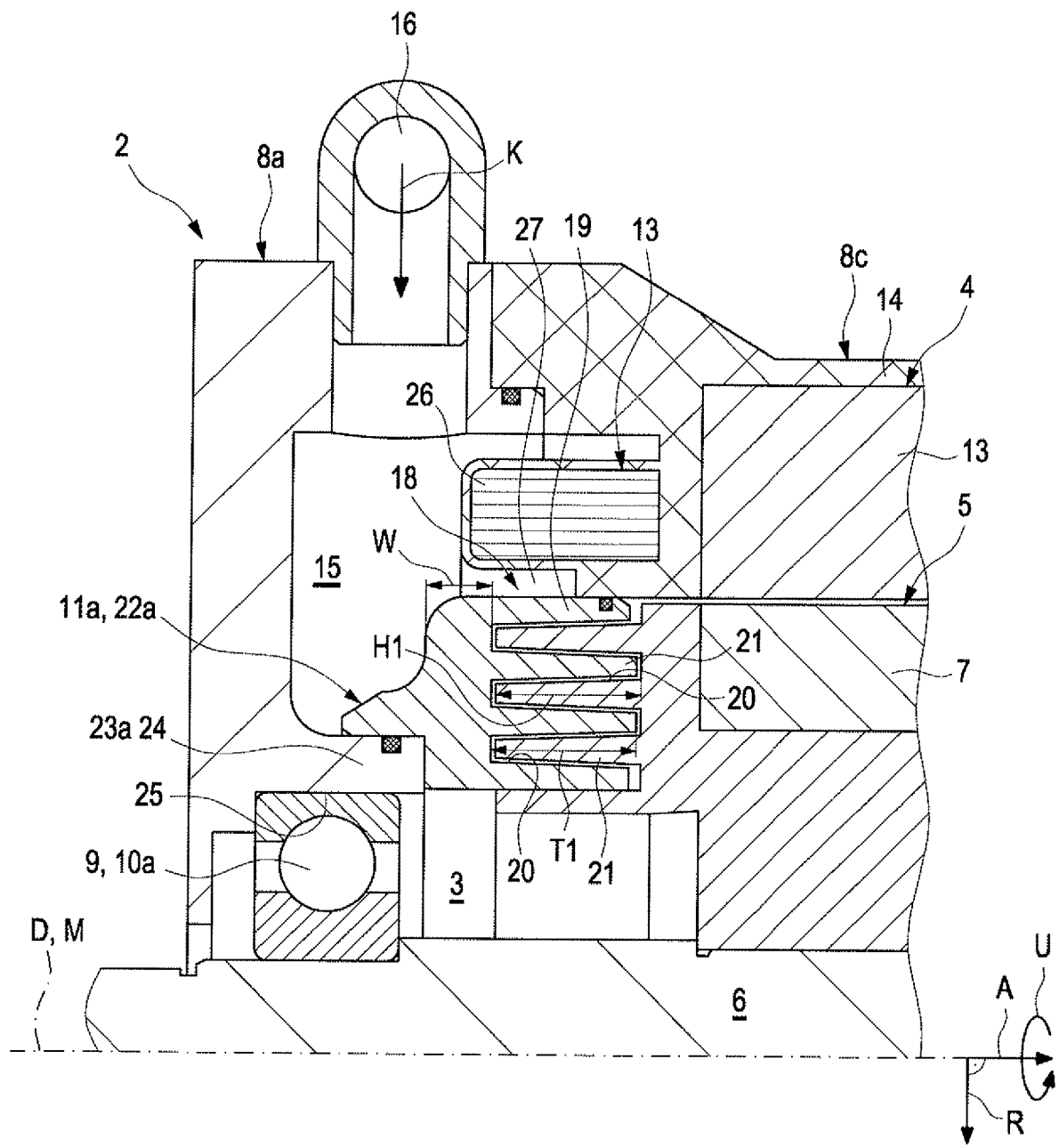
FIG. 2 shows a view of a detail of FIG. 1 in the region of the heat transmission body.

In the text which follows, reference is made to FIG. 2 which is an illustration of a detail of FIG. 1 in the region of the first heat transmission body 11a. As is illustrated by FIG. 2, a heat transmission structure 18 for transmitting waste heat from the rotor 5 to the heat transmission body 11a is formed on the first heat transmission body 11a and on the rotor 5. According to FIG. 2, the heat transmission structure 18 comprises a plurality of projections 21 which protrude from the rotor 5 toward the first heat transmission body 11a along the axial direction A and engage in complementary recesses 20 provided on the heat transmission body 11a. In an alternative variant (not illustrated in more detail in FIGS. 1 and 2), it is conceivable that the first heat transmission body 11a comprises a plurality of projections 21 which protrude axially from the heat transmission body toward the rotor 5 and which engage in recesses 20 which are complementary to the projections 21 and are provided on the rotor 5. The projections 21 can preferably be embodied in the manner of a comb. A distance X measured in the region of the heat transmission structure 18 between the heat transmission body 11a and the rotor 5 along the axial direction is at maximum 1 mm, preferably at maximum 0.5 mm. A recess depth T1 of the recesses T1 which form the heat transmission structure 18 on the first heat transmission body 11a and a projection height H1 of the projections 21 which form the heat transmission structure 18 on the first heat transmission body 11a is at least three times, preferably at least five times, the abovementioned wall thickness W of the cooling plate.

The illustration in FIG. 2 also indicates that the first housing part 8a has a (first) attachment section 23a to which the first heat transmission body 11a is attached. In addition, the bearing device 9 for rotatably mounting the rotor 5 is provided on the (first) attachment section 23a. The (first) attachment section 23a is expediently embodied as a sleeve 24 which projects axially inward from the first housing part 11a into the housing interior 3 and on whose inner side 25 the first bearing element 10a of the bearing device 9 is arranged. The second housing part 8b also has such a (second) attachment section (23b) to which the second heat transmission body 11b and the rotor 5 are attached. Likewise, the second bearing element 10b of the bearing device 9 can be provided on the second attachment section 23b.

The preceding considerations explained above with reference to FIG. 2, relating to the first heat transmission body 11a and to the first housing part 8a assigned to this first heat transmission body 11a also apply mutatis mutandis to the second heat transmission body 11b and to the second housing part 8b which is assigned to the second heat transmission body 11b.

An annular gap 27 can be respectively formed between winding end sections 26 of the stator coils 13, which project into the coolant space 15, and the heat transmission bodies 11a, 11b, said annular gap 27 being part of the coolant space 15.

The invention claimed is:

1. An electric machine for a vehicle, comprising:
   a stator and a rotor rotatable relative to the stator about a rotational axis that defines an axial direction,
   a housing at least partially surrounding a housing interior, wherein the housing includes a first housing part and a second housing part that bound the housing interior, and the rotor is rotatably mounted on the first housing part and the second housing part via a bearing device,
   at least one heat transmission body is arranged along the axial direction between at least one of the first housing part and the second housing part and the rotor, the at least one heat transmission body bounds, together with the at least one of the first housing part and the second housing part, a coolant space through which a coolant can flow,
   wherein the bearing device comprises a first bearing element and a second bearing element that are arranged at an axial distance from one another, such that the rotor is arranged axially between the first bearing element and the second bearing element, and
   wherein the axial position of the first bearing element and the second bearing element is defined such that that less than about 35% of the radial forces taken up by the first bearing element and the second bearing element are passed on to the at least one heat transmission body.

2. The machine as claimed in claim 1, wherein the at least one heat transmission body is provided separately from the first housing part and the second housing part.

3. The machine as claimed in claim 1, wherein at least one of:
   the at least one heat transmission body and the first housing part and the second housing part are provided non-uniformly in respect of material,
   a material of the at least one heat transmission body has a higher thermal conductivity than a material of at least one of the first housing part and the second housing part, and
   a material of at least one of the first housing part and the second housing part has at least one of a higher upper yield strength and a higher creep limit than a material of the at least one heat transmission body.

4. The machine as claimed in claim 1, wherein the at least one heat transmission body and the rotor comprise a heat transmission structure for transmitting heat from the rotor to the at least one heat transmission body.

5. The machine as claimed in claim 4, wherein the heat transmission structure and the first housing part and the second housing part are provided non-uniformly in respect of material.

6. The machine as claimed in claim 4, wherein a material of the heat transmission structure has a higher thermal conductivity than a material of at least one of the first housing part and the second housing part.

7. The machine as claimed in claim 4, wherein the at least one heat transmission body and the heat transmission structure are provided uniformly in respect of material.

8. The machine as claimed in claim 4, wherein the rotor is not mounted on the first housing part and the second housing part via the heat transmission structure or via the at least one heat transmission body.

9. The machine as claimed in claim 1, wherein the rotor is mounted directly on the first housing part and the second housing part.

10. The machine as claimed in claim 1, wherein a wall thickness, measured in the axial direction, of at least one of the first housing part and the second housing part is at least twice a wall thickness of the at least one heat transmission body.

11. The machine as claimed in claim 1, wherein the at least one heat transmission body includes two heat transmission bodies bounding the coolant space,
wherein a first heat transmission body of the two heat transmission bodies is arranged along the axial direction between the first housing part and the rotor, and a second heat transmission body of the two heat transmission bodies is arranged along the axial direction between the rotor and the second housing part.

12. The machine as claimed in claim 1, wherein the stator is attached to at least one of the first housing part and the second housing part.

13. The machine as claimed in claim 1, wherein the stator is arranged at a distance from the at least one heat transmission body.

14. The machine as claimed in claim 1, wherein one of:
the at least one heat transmission body is attached to the at least one of the first housing part and the second housing part; and
the at least one heat transmission body and the at least one of the first housing part and the second housing part are provided in one piece.

15. The machine as claimed in claim 1, further comprising a heat transmission structure for transmitting waste heat from the rotor to the at least one heat transmission body, wherein the heat transmission structure comprises at least two projections that protrude axially from the rotor toward the at least one heat transmission body and engage in complementary recesses that are provided on the at least one heat transmission body.

16. The machine as claimed in claim 15, wherein the at least two projections are structured as a comb.

17. The machine as claimed in claim 1, further comprising a heat transmission structure for transmitting waste heat from the rotor to the at least one heat transmission body, wherein the heat transmission structure comprises at least two projections that protrude axially from the at least one heat transmission body to the rotor and engage in complementary recesses that are provided on the rotor.

18. The machine as claimed in claim 1, further comprising a heat transmission structure for transmitting waste heat from the rotor to the at least one heat transmission body, wherein a distance, which is measured in a region of the heat transmission structure, between the at least one heat transmission body and the rotor along the axial direction, is at maximum 1 mm.

19. The machine as claimed in claim 1, wherein the first housing part and the second housing part are composed of a different material than the at least one heat transmission body.

20. The machine as claimed in claim 1, wherein a material of at least one of the first housing part and the second housing part has a thermal conductivity which is lower than a thermal conductivity of the at least one heat transmission body.

21. The machine as claimed in claim 1, wherein a material of the at least one heat transmission body has a thermal conductivity of at least 100 W/(m*k).

22. The machine as claimed in claim 1, wherein the housing further includes a third housing part formed radially limited and from plastic via encapsulation of the stator by injection molding.

23. The machine as claimed in claim 1, wherein an annular gap, which is part of the coolant space, is provided between winding end sections that project into the coolant space.

24. An electric machine for a vehicle, comprising:
a stator and a rotor rotatable relative to the stator about a rotational axis that defines an axial direction,
a housing at least partially surrounding a housing interior, wherein the housing includes a first housing part and a second housing part that bound the housing interior, and the rotor is rotatably mounted on the first housing part and the second housing part via a bearing device,
at least one heat transmission body is arranged along the axial direction between at least one of the first housing part and the second housing part and the rotor, the at least one heat transmission body bounds, together with the at least one of the first housing part and the second housing part, a coolant space through which a coolant can flow,
the bearing device comprises a first bearing element via which the rotor is mounted on the first housing part, and comprises a second bearing element arranged axially at a distance from the first bearing element and via which the rotor is mounted on the second housing part,
a distance measured along the axial direction between the at least one heat transmission body and the first housing part is larger than a distance measured along the axial direction between the first bearing element and the first housing part, and
a distance measured along the axial direction between a second heat transmission body and the second housing part is larger than a distance measured along the axial direction between the second bearing element and the second housing part.

25. An electric machine for a vehicle, comprising:
a stator and a rotor rotatable relative to the stator about a rotational axis that defines an axial direction,
a housing at least partially surrounding a housing interior, wherein the housing includes a first housing part and a second housing part that bound the housing interior, and the rotor is rotatably mounted on the first housing part and the second housing part via a bearing device,
at least one heat transmission body is arranged along the axial direction between at least one of the first housing part and the second housing part and the rotor, the at least one heat transmission body bounds, together with the at least one of the first housing part and the second housing part, a coolant space through which a coolant can flow, and
wherein the at least one heat transmission body is a deep-drawn component extending at least in certain sections transversely to the axial direction with a wall thickness measured along the axial direction at maximum 3 mm.

26. The machine as claimed in claim 25, wherein at least one of a recess depth and a projection height of recesses or projections, which form the heat transmission structure on the at least one heat transmission body, is at least three times the wall thickness of the deep-drawn component.

27. An electric machine for a vehicle, comprising:
a stator and a rotor rotatable relative to the stator about a rotational axis that defines an axial direction,
a housing at least partially surrounding a housing interior, wherein the housing includes a first housing part and a second housing part that bound the housing interior, and the rotor is rotatably mounted on the first housing part and the second housing part via a bearing device, at least one heat transmission body is arranged along the axial direction between at least one of the first housing part and the second housing part and the rotor, the at least one heat transmission body bounds, together with the at least one of the first housing part and the second housing part, a coolant space through which a coolant can flow, and wherein at least one of the first housing part and the second housing part has an attachment section to which the at least one heat transmission body is attached, wherein the bearing device for rotatably mounting the rotor is also provided on the attachment section.

28. The machine as claimed in claim 27, wherein the attachment section is a sleeve that projects inward into the housing interior along the axial direction from the at least one of the first housing part and the second housing part, and on the inner side of the sleeve a bearing element of the bearing device is arranged.

29. An electric machine for a vehicle, comprising:
a stator and a rotor rotatable relative to the stator about a rotational axis that defines an axial direction,
a housing at least partially surrounding a housing interior, wherein the housing includes a first housing part and a second housing part that bound the housing interior, and the rotor is rotatably mounted on the first housing part and the second housing part via a bearing device,
at least one heat transmission body is arranged along the axial direction between at least one of the first housing part and the second housing part and the rotor, the at least one heat transmission body bounds, together with the at least one of the first housing part and the second housing part, a coolant space through which a coolant can flow, and
wherein the at least one heat transmission body is locked exclusively via axial compression.

* * * * *